United States Patent
Suzaki et al.

(10) Patent No.: US 8,690,230 B2
(45) Date of Patent: Apr. 8, 2014

(54) BODY FRONT STRUCTURE OF VEHICLE

(71) Applicants: Takahiro Suzaki, Toyota (JP); Takashi Yao, Toyota (JP)

(72) Inventors: Takahiro Suzaki, Toyota (JP); Takashi Yao, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/741,152

(22) Filed: Jan. 14, 2013

(65) Prior Publication Data

US 2013/0181482 A1    Jul. 18, 2013

(30) Foreign Application Priority Data

Jan. 16, 2012 (JP) ................................ 2012-006430

(51) Int. Cl.
*B60S 1/04* (2006.01)

(52) U.S. Cl.
USPC .......................................................... 296/192

(58) Field of Classification Search
USPC .................. 296/192, 187.04, 189.09, 187.12, 296/193.02, 193.09, 203.02, 203.03, 70; 180/274, 282, 68.1, 69.2, 69.21, 90; 280/730.1
See application file for complete search history.

(56) References Cited

U.S. PATENT DOCUMENTS

| | | | | |
|---|---|---|---|---|
| 3,596,978 A | * | 8/1971 | Wessells et al. | 296/203.02 |
| 4,699,419 A | * | 10/1987 | Kawase et al. | 296/192 |
| 4,717,198 A | * | 1/1988 | Komatsu | 296/192 |
| 4,819,550 A | * | 4/1989 | Ioka | 454/147 |
| 4,886,314 A | * | 12/1989 | Maeda | 296/192 |
| 5,042,872 A | * | 8/1991 | Yoshii | 296/203.02 |
| 5,052,742 A | * | 10/1991 | Akoshima et al. | 296/192 |
| 5,244,248 A | * | 9/1993 | Bovellan | 296/187.09 |
| 5,411,311 A | * | 5/1995 | Shimmell et al. | 296/203.02 |
| 6,086,144 A | * | 7/2000 | Kuwano | 296/192 |
| 6,322,124 B1 | | 11/2001 | Kim | |
| 6,793,275 B1 | * | 9/2004 | Chernoff et al. | 296/193.11 |
| 7,059,667 B2 | * | 6/2006 | Tomita | 296/203.03 |
| 7,845,716 B2 | * | 12/2010 | Kiyotake et al. | 296/203.02 |
| 8,128,160 B2 | * | 3/2012 | Leanza et al. | 296/203.02 |
| 8,201,873 B2 | * | 6/2012 | Nishimura et al. | 296/193.06 |
| 2008/0224502 A1 | * | 9/2008 | Miki | 296/203.02 |
| 2013/0076073 A1 | * | 3/2013 | Tanaka et al. | 296/192 |

FOREIGN PATENT DOCUMENTS

| | | |
|---|---|---|
| JP | 11-115801 A | 4/1999 |
| JP | 11-192966 A | 7/1999 |
| JP | 11-301517 A | 11/1999 |
| JP | 2001-191955 A | 7/2001 |
| JP | 2007-030720 A | 2/2007 |

* cited by examiner

*Primary Examiner* — Kiran B Patel
(74) *Attorney, Agent, or Firm* — Gifford, Krass, Sprinkle, Anderson & Citkowski, P.C.

(57) ABSTRACT

A body front structure of a vehicle includes: a first connecting member that extends in a vehicle width direction, is open upward in a side sectional view, and connects a front end portion and a rear end portion of a cowl together; and a second connecting member that extends in the vehicle longitudinal direction, in a position to a rear of the cowl in the vehicle longitudinal direction and to an inside of a front pillar inner panel in the vehicle width direction, a front end portion of the second connecting member being fixed to the rear end portion of the cowl so as to overlap with the first connecting member when viewed along the vehicle longitudinal direction, and a rear end portion of the second connecting member being fixed, together with a bracket joined to an instrument panel reinforcement, to the front pillar inner panel.

14 Claims, 5 Drawing Sheets

BODY FRONT STRUCTURE OF VEHICLE

INCORPORATION BY REFERENCE

The disclosure of Japanese Patent Application No. 2012-006430 filed on Jan. 16, 2012 including the specification, drawings and abstract is incorporated herein by reference in its entirety.

BACKGROUND OF THE INVENTION

1. Field of the Invention

The invention relates to a body front structure of a vehicle.

2. Description of Related Art

Japanese Patent Application Publication No. 11-115801 (JP 11-115801 A) describes a vehicle front pillar structure in which a closed cross-section is formed by a front pillar reinforcement and a front pillar inner panel. This closed cross-section is formed generally constant in size in a direction perpendicular to the closed cross-section (i.e., a vertical direction).

An instrument panel reinforcement bracket is provided to an inside, in a vehicle width direction, of the front pillar inner panel. A front end portion of the instrument panel reinforcement bracket is connected to a connecting portion of the front pillar reinforcement and the front pillar inner panel. Moreover, the instrument panel reinforcement bracket is connected by a cowl brace to a cowl that is arranged in front of a front pillar, in a vehicle longitudinal direction.

However, with this vehicle front pillar structure, when a barrier side collision in which a barrier overlaps with the front pillar occurs, a side collision load is not sufficiently transmitted to a surrounding member of the front pillar such as the cowl, so mainly the instrument panel reinforcement receives the side collision load. As a result, the cross section of the front pillar may give way and the front pillar may bend.

SUMMARY OF THE INVENTION

The invention provides a body front structure of a vehicle, with which it is possible to suppress bending of a front pillar when a side collision occurs.

One aspect of the invention relates to a body front structure of a vehicle. This body front structure includes a first connecting member and a second connecting member. The first connecting member extends in a vehicle width direction, is open upward in a side sectional view taken along a vehicle longitudinal direction, and connects a front end portion and a rear end portion of a cowl together. The second connecting member extends in the vehicle longitudinal direction, in a position to a rear of the cowl in the vehicle longitudinal direction and to an inside of a front pillar inner panel in the vehicle width direction. A front end portion of the second connecting member is fixed to the rear end portion of the cowl so as to overlap with the first connecting member when viewed along the vehicle longitudinal direction. A rear end portion of the second connecting member is fixed, together with a bracket that is joined to an instrument panel reinforcement, to the front pillar inner panel.

In the above aspect of the invention, a cowl that is open upward in a side sectional view taken along the vehicle longitudinal direction extends in the vehicle width direction.

Here, the second connecting member extends in the vehicle longitudinal direction, in a position to the rear of the cowl in the vehicle longitudinal direction and to the inside of the front pillar inner panel in the vehicle width direction. Also, the front end portion of the second connecting member is fixed to the rear end portion of the cowl, and the rear end portion of the second connecting member is fixed, together with the bracket that is joined to the instrument panel reinforcement, to the front pillar inner panel. Therefore, when a barrier side collision in which a barrier overlaps with a front pillar occurs, a side collision load is transmitted to the instrument panel reinforcement via the bracket, and is also transmitted to the cowl via the second connecting member.

Moreover, the front end portion and the rear end portion of the cowl are connected together by the first connecting member, and the front end portion of the second connecting member is fixed to the rear end portion of the cowl so as to overlap with the first connecting member when viewed along the vehicle longitudinal direction. Therefore, the first connecting member reinforces the cowl and enables the side collision load transmitted to the rear end portion of the cowl to be efficiently transmitted to the front end portion of the cowl. As a result, a side collision load can also be transmitted to a bent edge line of the front end portion of the cowl. Therefore, a side collision load is reliably transmitted to not only the instrument panel reinforcement, but also the cowl, so bending of the front pillar when a side collision occurs is suppressed.

With the body front structure of a vehicle according to the above aspect of the invention, it is possible to suppress bending of a front pillar when a side collision occurs.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
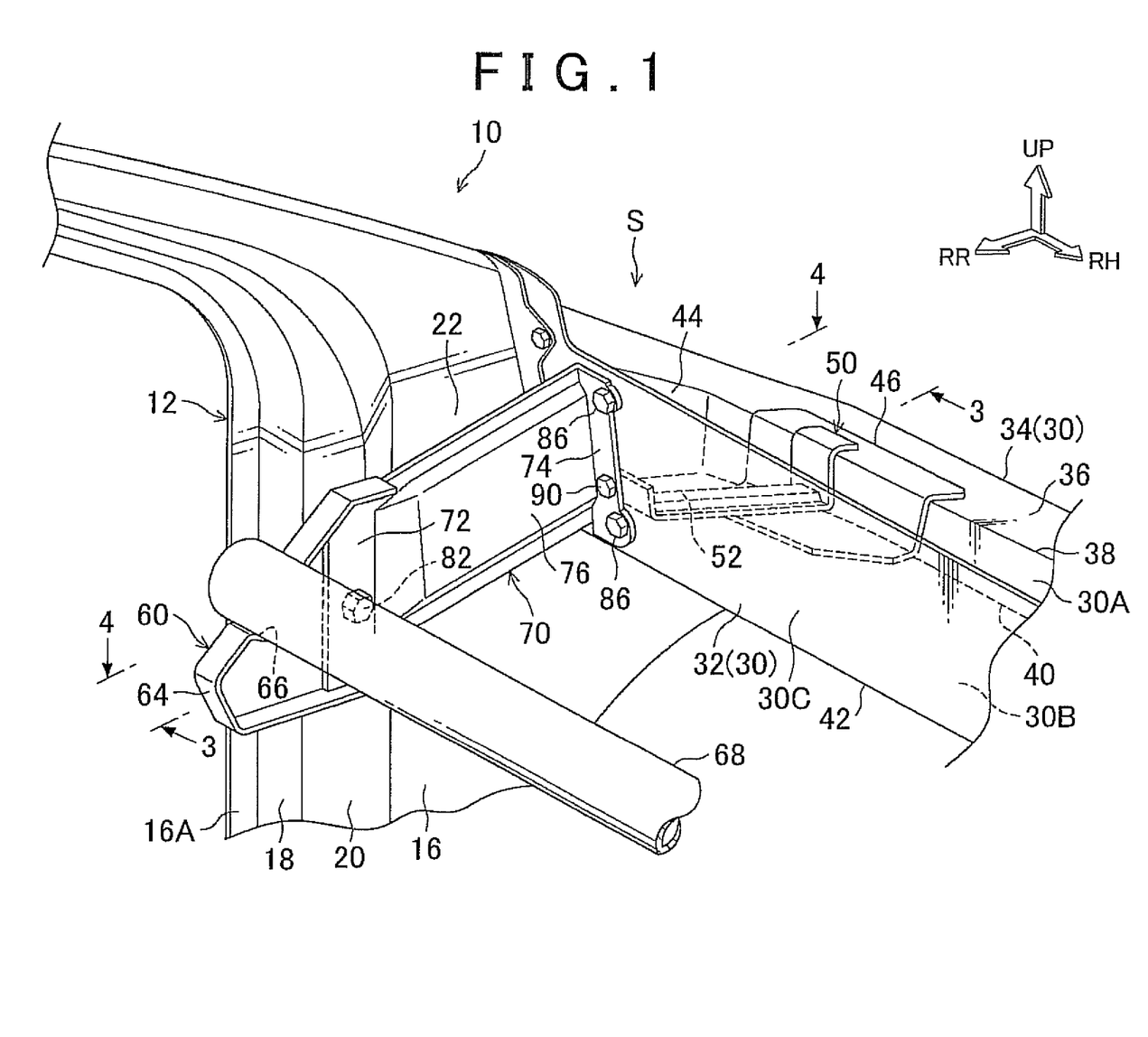
FIG. 1 is a perspective view of main portions of a vehicle to which a body front structure of a vehicle according to one example embodiment of the invention has been applied, as viewed diagonally from a right rear direction of the vehicle.

FIG. 1 is a perspective view of main portions of a vehicle 10 (automobile) to which a body front structure S of a vehicle (hereinafter simply referred to as the "body front structure S") according to one example embodiment of the invention has been applied. In the drawings, the arrow RR indicates a direction toward the rear of the vehicle, the arrow RH indicates a direction toward the right side of the vehicle (i.e., one side in the vehicle width direction), and the arrow UP indicates a direction upward with respect to the vehicle. In addition, the body front structure S is configured bilaterally symmetrical in the vehicle width direction, so the body front structure S on the left of the vehicle will be described, and a description of the body front structure S on the right of the vehicle will be omitted. The body front structure according to the invention is particularly suitably used in an automobile.

As shown in the drawing, the vehicle 10 to which the body front structure S is applied includes: a front pillar 12 provided in front, in the longitudinal direction of the vehicle, of a front door opening, not shown, in a side portion of the vehicle 10; a cowl main body 30 that serves as a cowl that is arranged on a lower edge of a windshield glass, not shown, in front, in the longitudinal direction of the vehicle, of the front pillar 12; a balk 50 that serves as a first connecting member; an instrument panel reinforcement bracket (hereinafter, simply referred to as the "instrument panel R/F bracket") 60 that serves as a bracket that is connected to an instrument panel reinforcement (hereinafter, simply referred to as the "instrument panel R/F") 68 that is arranged to the rear, in the longitudinal direction of the vehicle, of the front pillar 12; and a brace 70 that serves as a second connecting member.

Figure 4:
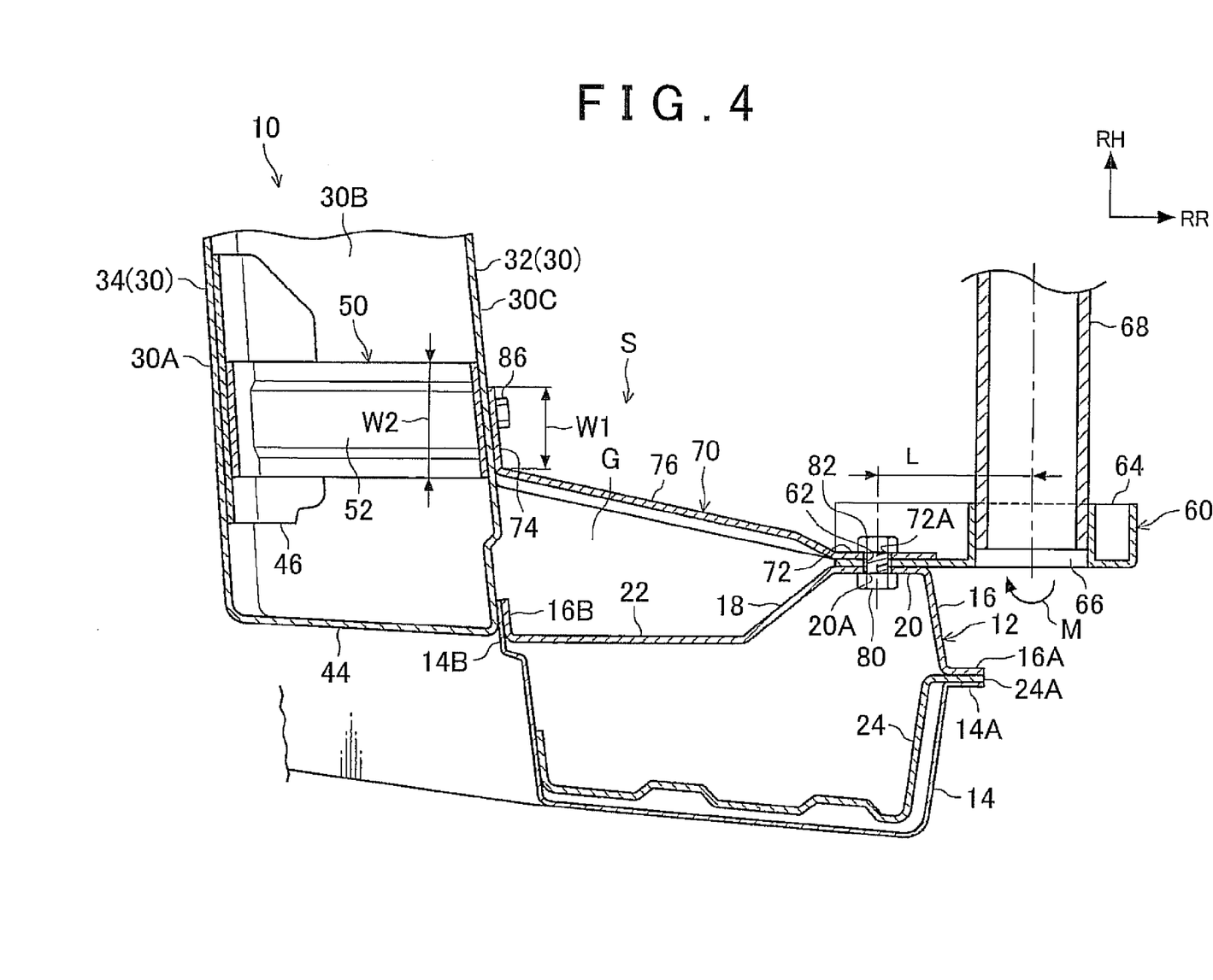
FIG. 4 is a horizontal sectional view of the main portions of the vehicle shown in FIG. 1, as viewed from above the vehicle (i.e., a sectional view taken along line 4-4 in FIG. 1)

As shown in FIG. 4, the front pillar 12 includes a side member outer 14 that forms a vehicle width direction outer portion of the front pillar 12, a front pillar inner panel 16 that forms a vehicle width direction inner portion of the front pillar 12, and a front pillar reinforcement (hereinafter, simply referred to as a "front pillar R/F") 24 that is arranged between the front pillar inner panel 16 and the side member outer 14.

The side member outer 14 is formed in a generally hat shape that is open to the inside in the vehicle width direction (i.e., to the right) in a horizontal sectional view viewed from above the vehicle, and extends in the vertical direction of the vehicle. A rear flange portion 14A is formed on a rear end portion of the side member outer 14 with respect to the vehicle. The rear flange portion 14A is arranged so that a plate thickness direction thereof substantially coincides with the vehicle width direction. A front flange portion 14B is formed on a front end portion of the side member outer 14 with respect to the vehicle.

The front pillar inner panel 16 is arranged so that the plate thickness direction thereof substantially coincides with the vehicle width direction, and extends in the vertical direction of the vehicle, at an open portion of the side member outer 14. A rear flange portion 16A is formed on a rear end portion of the front pillar inner panel 16 with respect to the vehicle. The rear flange portion 16A is arranged facing the rear flange portion 14A of the side member outer 14. This rear flange portion 16A is joined, together with a rear flange portion 24A of the front pillar R/F 24 that will be described later, by spot welding or the like to the rear flange portion 14A.

The front flange portion 16B is formed on a front end portion of the front pillar inner panel 16 with respect to the vehicle. The front flange portion 16B is bent inward in the vehicle width direction, is arranged facing the front flange portion 14B of the side member outer 14, and is joined by spot welding or the like to the front flange portion 14B. As a result, a closed cross-section is formed by the front pillar inner panel 16 and the side member outer 14.

A protruding portion 18 is formed on a rear portion of the front pillar inner panel 16 with respect to the vehicle. The protruding portion 18 protrudes farther to the inside in the vehicle width direction than a general surface 22 of the front pillar inner panel 16, and is formed in a generally trapezoidal shape that is open to the outside in the vehicle width direction (i.e., to the left) in a horizontal sectional view. A bottom wall 20 of the protruding portion 18 is arranged so that the plate thickness direction thereof substantially coincides with the vehicle width direction, and a weld nut 80 for fastening the instrument panel R/F bracket 60 and the brace 70, which will be described later, is fixed to the inside surface, with respect to the vehicle width direction, of this bottom wall 20. A through-hole 20A is formed in the bottom wall 20, and this through-hole 20A is arranged coaxially with the weld nut 80.

The front pillar R/F 24 is formed in a generally hat shape that is open to the inside in the vehicle width direction in a horizontal sectional view, and extends in the vertical direction of the vehicle. The rear flange portion 24A that is bent toward the rear of the vehicle is formed on a rear end portion of the front pillar R/F 24 with respect to the vehicle. This rear flange portion 24A is arranged between the rear flange portion 14A and the rear flange portion 16A, and is joined to both. A front end portion of the front pillar R/F 24 with respect to the vehicle is arranged in a position facing a side wall of the side member outer 14, and is joined by spot welding or the like to this side wall. A front door, not shown, is provided on the rear side of the front pillar 12 in the vehicle longitudinal direction. A beltline reinforcement (hereinafter, simply referred to as a "beltline R/F"), not shown, is provided along the vehicle longitudinal direction on a beltline portion of this front door.

Figure 2:
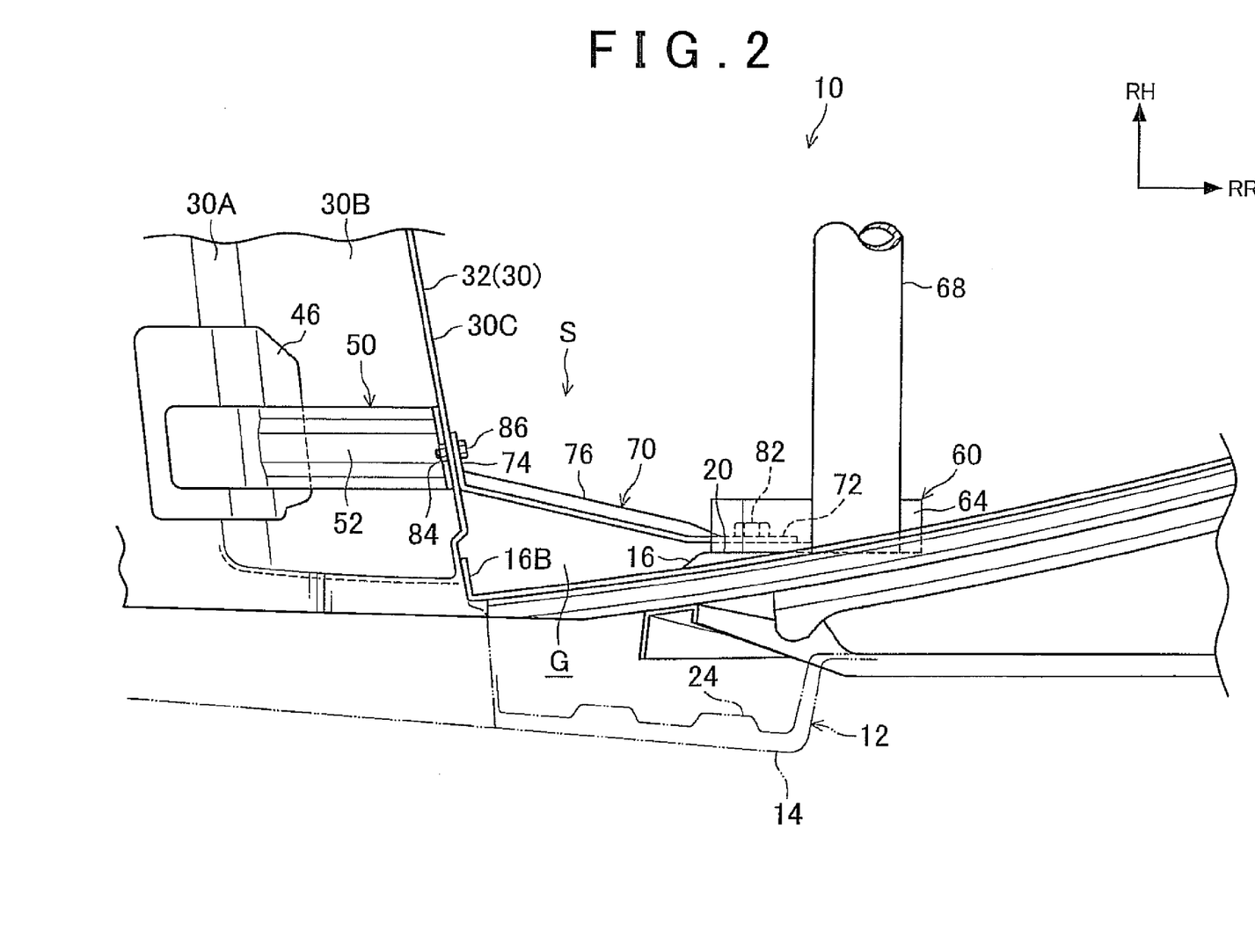
FIG. 2 is a plan view of the main portions of the vehicle shown in FIG. 1, as viewed from above the vehicle.
Figure 3:
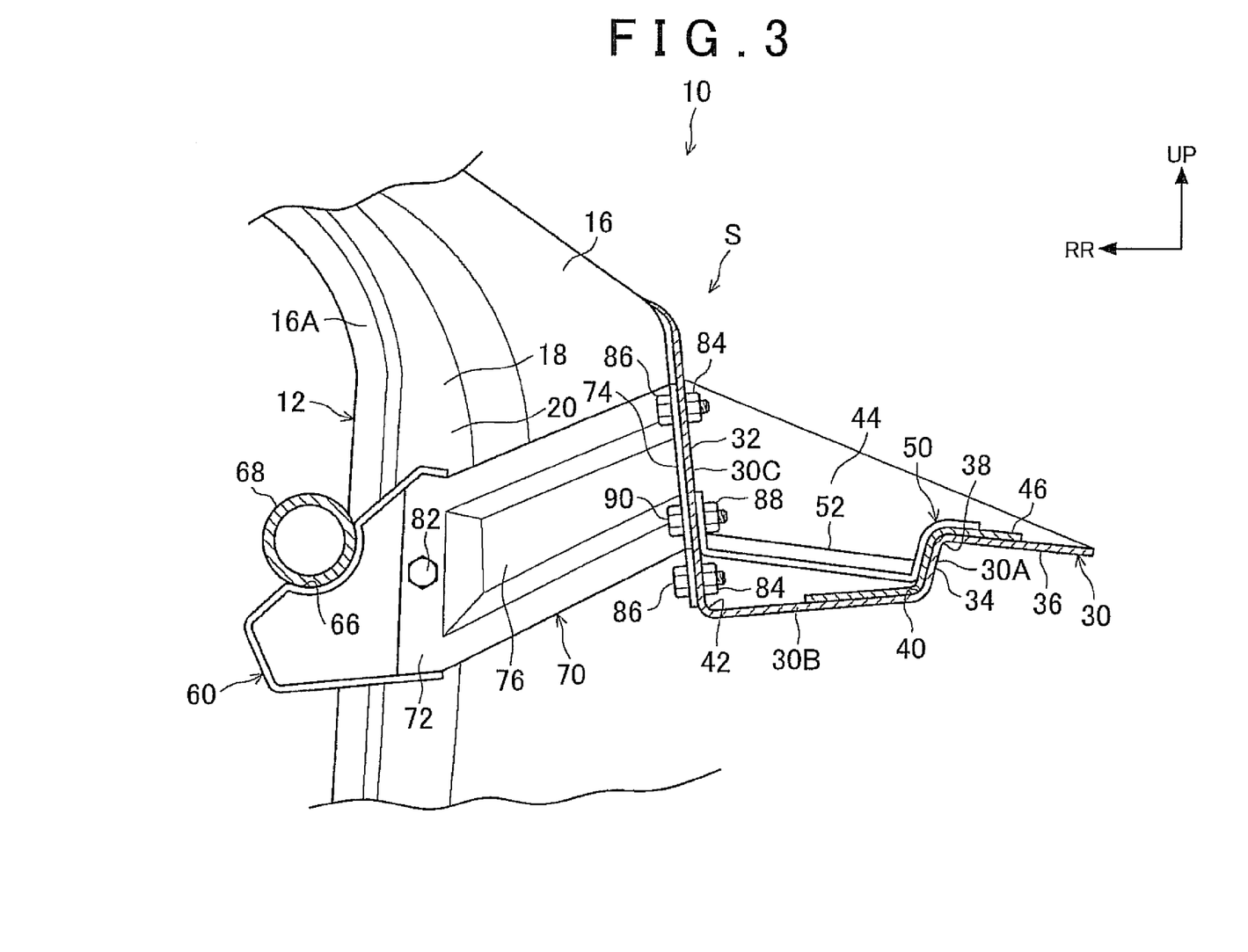
FIG. 3 is a side sectional view of the main portions of the vehicle shown in FIG. 1, as viewed from the right side of the vehicle (i.e., a sectional view taken along line 3-3 in FIG. 1)

As shown in FIGS. 1 to 3, the cowl main body 30 extends in the vehicle width direction, and is formed in a generally U-shape that opens upward in a side sectional view viewed from the right side of the vehicle. This cowl main body 30 includes a cowl outer panel 32 that forms a rear portion of the cowl main body 30 with respect to the vehicle, and a cowl inner panel 34 that forms a front portion of the cowl main body 30 with respect to the vehicle. The cowl outer panel 32 and the cowl inner panel 34 are joined at a bottom wall 30B of the cowl main body 30 (the joining portion of the cowl outer panel 32 and the cowl inner panel 34 is not shown in FIG. 3). A cowl side flange portion 36 is formed on a front end portion of the cowl main body 30 with respect to the vehicle. This cowl side flange portion 36 is bent toward the front of the vehicle. As a result, a bent edge line portion 38, a bent edge line portion 40, and a bent edge line portion 42 are formed on the cowl main body 30.

Also, the cowl main body 30 has a cowl side panel 44 at both end portions in the vehicle width direction. The cowl side panel 44 is joined by spot welding or the like to the cowl outer panel 32 and the cowl inner panel 34. Further, a pair of weld nuts 84 for fastening a brace 70 that will be described later is fixed to the front side surface of a rear wall 30C (a rear end portion) of the cowl main body 30 with respect to the vehicle. These weld nuts 84 are arranged along the vertical direction of the vehicle (see FIG. 3).

A cowl reinforcement 46 is provided at each of both end portions of the cowl main body 30, with respect to the vehicle width direction, on the inside of this cowl main body 30. This cowl reinforcement 46 is bent in a generally crank shape along the bottom wall 30B, a front wall 30A, and the cowl side flange portion 36 of the cowl main body 30, in a side view viewed from the right side of the vehicle. The cowl reinforcement 46 is joined to the cowl main body 30 by spot welding or the like.

As shown in FIGS. 1 to 4, the balk 50 is made of rectangular-shaped sheet metal and is bent in a generally U-shape that opens upward with respect to the vehicle when viewed from the right side of the vehicle. The balk 50 extends between the front wall 30A (a front end portion) and the rear wall 30C (the rear end portion) of the cowl main body 30, with the rear end portion with respect to the vehicle arranged between the pair of weld nuts 84 described above. The rear end portion of the balk 50 with respect to the vehicle is bent upward with respect to the vehicle, and is arranged facing the rear wall 30C. A weld nut 88 is fixed to the vehicle front surface of this end portion (see FIG. 3). The balk 50 is fastened (i.e., fixed) to the rear wall 30C of the cowl main body 30 by a bolt 90 being screwed into each weld nut 88 with the brace 70 that will be described later interposed between the bolt 90 and the weld nut 88. The front end portion of the balk 50 with respect to the vehicle is bent in a generally crank-shape viewed from the right side of the vehicle, and is joined by spot welding or the like to the cowl reinforcement 46. Therefore, the front wall 30A (the front end portion) and the rear wall 30C (the rear end portion) of the cowl main body 30 are connected together by the balk 50, so that the cowl main body 30 is reinforced.

Moreover, a balk-side bead portion 52 (in a broad sense, an element that may be understood as a "connection reinforcing portion") is formed on the balk 50. This balk-side bead portion 52 protrudes upward with respect to the vehicle, and extends in the vehicle longitudinal direction.

The instrument panel R/F bracket 60 is faulted in a generally triangular plate shape when viewed from the right side of the vehicle, and is provided on the inside of the front pillar inner panel 16 in the vehicle width direction. A circular mounting hole 62 is provided in a front end portion of the instrument panel R/F bracket 60 with respect to the vehicle (see FIG. 4), and this mounting hole 62 is arranged coaxially with the weld nut 80. A bolt 82 is inserted into this mounting hole 62. The instrument panel R/F bracket 60 is fixed (i.e., fastened), together with the brace 70 that will be described later, to the front pillar inner panel 16 by this bolt 82 being screwed into the weld nut 80.

A bracket-side flange portion 64 is integrally formed on a peripheral edge portion of the instrument panel R/F bracket 60, with the exception of the front end of the peripheral edge portion with respect to the vehicle. The bracket-side flange portion 64 protrudes toward the inside in the vehicle width direction from the instrument panel R/F bracket 60.

The pipe-shaped instrument panel R/F 68 is provided above the instrument panel R/F bracket 60, in the vertical direction of the vehicle, to a rear side of the front pillar 12 with respect to the vehicle. The instrument panel R/F 68 is separated by a distance L from a portion where the instrument panel R/F bracket 60 and the front pillar inner panel 16 are fastened together, and extends in the vehicle width direction (see FIG. 4).

A mounting portion 66 is provided on an outer peripheral portion of the instrument panel R/F bracket 60. This mounting portion 66 is curved in an arc-shape corresponding to the outer peripheral portion of the instrument panel R/F 68, and is joined to the instrument panel R/F 68 by welding or the like (see FIG. 3). As a result, the front pillar inner panel 16 and the instrument panel R/F 68 are connected by the instrument panel R/F bracket 60.

The brace 70 is made of sheet metal and is formed in a generally parallelogram shape viewed from the right side of the vehicle. The brace 70 is provided to the inside of the front pillar inner panel 16 with respect to the vehicle width direction, in a position at the same height as the instrument panel R/F 68. The brace 70 is arranged along the vehicle longitudinal direction in a position at the same height as the beltline R/F of the front door described above. Note that in the invention, the arrangement, in which the brace 70 is arranged in a position at the same height as the instrument panel R/F 68, means an arrangement such that a side collision load that is input to the instrument panel R/F 68 is transmitted to the front wall 30A of the cowl main body 30 via the brace 70. Accordingly, the brace 70 has a continuous portion from the front end to the rear end of the brace 70, the continuous portion overlapping the instrument panel R/F 68 in the projection to a plane perpendicular to the vehicle longitudinal direction. This also applies to the positional relation between the brace 70 and the belt line R/F. A rear brace fixing portion 72 is formed at a rear end portion of the brace 70 with respect to the vehicle. This rear brace fixing portion 72 is arranged facing the front end portion of the instrument panel R/F bracket 60 with respect to the vehicle so that the plate thickness direction of the rear brace fixing portion 72 substantially coincides with the vehicle width direction. A circular fixing hole 72A is formed in this rear brace fixing portion 72 (see FIG. 4). This fixing hole 72A is arranged coaxially with the weld nut 80. The bolt 82 described above is inserted into this fixing hole 72A, so that the brace 70 is fastened (i.e., fixed), together with the instrument panel R/F bracket 60, to the front pillar inner panel 16.

The brace 70 is arranged extending, inclined inward in the vehicle width direction, from the rear brace fixing portion 72 toward the front of the vehicle when viewed from above. A gap G is formed between a front portion of the brace 70 with respect to the vehicle and the general surface 22 of the front pillar inner panel 16 (see FIG. 4). A front brace fixing portion 74 is formed on a front end portion of the brace 70 with respect to the vehicle. The front brace fixing portion 74 is bent inward in the vehicle width direction, and is arranged facing the rear end portion of the balk 50 with respect to the vehicle and the rear wall 30C (the rear end portion) of the cowl main body 30. A width dimension W1 of the front brace fixing portion 74 is set smaller than a width dimension W2 of the balk 50, and the front brace fixing portion 74 is arranged so as to fall within the width of the balk 50 (see FIG. 4). That is, the rear end portion of the balk 50 with respect to the vehicle and the front brace fixing portion 74 are arranged overlapping in the vehicle longitudinal direction. The brace 70 is fastened (i.e., fixed) to the rear wall 30C of the cowl main body 30 by a pair of bolts 86 passing through the front brace fixing portion 74 and being screwed into the weld nuts 84, and the bolt 90 passing through the front brace fixing portion 74 and being screwed into the weld nut 88.

Furthermore, a brace-side bead portion 76 that functions as a reinforcing portion is provided on the brace 70. This brace-side bead portion 76 protrudes inward in the vehicle width direction, and extends in the vehicle longitudinal direction along the brace 70.

Next, operation and effects of the example embodiments will be described.

In the vehicle 10 structured as described above, when a barrier side collision, in which a barrier overlaps with the front pillar 12, occurs, a side collision load toward the inside in the vehicle width direction is input to the front pillar 12.

Here, the brace 70 extends in the vehicle longitudinal direction, in a position to the rear of the cowl main body 30 in the vehicle longitudinal direction and to the inside of the front pillar inner panel 16 in the vehicle width direction. The front brace fixing portion 74 of the brace 70 is fastened (i.e., fixed) to the rear wall 30C (the rear end portion) of the cowl main body 30 by the bolts 86 and the weld nuts 84. The rear brace fixing portion 72 of the brace 70 is fastened (i.e., fixed), together with the instrument panel R/F bracket 60, to the front pillar inner panel 16 by the bolt 82 and the weld nut 80.

Therefore, the side collision load input to the front pillar 12 is distributed to a path along which the load is transmitted to the instrument panel R/F bracket 60 and a path along which the load is transmitted to the brace 70. The load transmitted to the instrument panel R/F bracket 60 is transmitted to the instrument panel R/F 68 via the instrument panel R/F bracket 60. The load transmitted to the brace 70 is transmitted to the cowl main body 30 via the brace 70.

Moreover, the front wall 30A (the front end portion) and the rear wall 30C (the rear end portion) of the cowl main body 30 are connected together by the balk 50, and the front brace fixing portion 74 of the brace 70 is fixed to the rear wall 30C (the rear end portion) of the cowl main body 30 so as to overlap with the balk 50 when viewed along the vehicle longitudinal direction.

Therefore, the cowl main body 30 is reinforced by the balk 50, and the side collision load transmitted to the rear wall 30C of the cowl main body 30 is efficiently transmitted to the front wall 30A of the cowl main body 30 by the balk 50. As a result, the side collision load is transmitted also to the bent edge line portion 38 and the bent edge line portion 40 of the cowl main body 30. Accordingly, the side collision load is reliably transmitted to not only the instrument panel R/F 68, but also the cowl main body 30, so that bending of the front pillar 12 when a side collision occurs is suppressed.

The protruding portion 18 that protrudes inward in the vehicle width direction is formed on the front pillar inner panel 16, and the brace 70 is fastened, together with the instrument panel R/F bracket 60, to the bottom wall 20 of the protruding portion 18.

Therefore, the gap G is formed between the front portion of the brace 70 with respect to the vehicle and the general surface 22 of the front pillar inner panel 16, so that interference between the brace 70 and the general surface 22 when a barrier side collision occurs is suppressed. That is, a side collision load will act on the portion where the brace 70 and instrument panel R/F bracket 60 are fastened to the front pillar inner panel 16. As a result, the position where the side collision load acts on the brace 70 and the instrument panel R/F bracket 60 is reliably set.

Moreover, the protruding portion 18 is formed on a rear-side portion of the front pillar inner panel 16 with respect to the vehicle. Thus, it is possible to shorten the distance L from the portion where the instrument panel R/F bracket 60 and the brace 70 are fastened to the front pillar inner panel 16, to the instrument panel R/F 68. Therefore, a bending moment in the direction of arrow M that acts on the instrument panel R/F 68 from the side collision load input to the instrument panel R/F bracket 60 is able to be reduced, as shown in FIG. 4. As a result, the instrument panel R/F 68 is able to receive the side collision load, while bending of a middle portion of the instrument panel R/F 68 with respect to the vehicle width direction such that it (i.e., the middle portion) protrudes toward the rear of the vehicle is suppressed.

The brace 70 is arranged extending, inclined inward in the vehicle width direction, from the rear brace fixing portion 72 toward front brace fixing portion 74 when viewed from above. Therefore, the extending direction of the brace 70 is made closer to the direction of the side collision load, compared with that in the case where the brace 70 extends toward the front of the vehicle from the rear brace fixing portion 72 toward the front brace fixing portion 74. As a result, the side collision load when a barrier side collision occurs is effectively transmitted to the cowl main body 30 by the brace 70.

Furthermore, the brace 70 is arranged at the same height as the instrument panel R/F 68. Therefore, the side collision load is efficiently distributed to the cowl main body 30.

Also, the brace 70 is arranged in the vehicle longitudinal direction at a position that is at the same height as the beltline R/F (i.e., the beltline portion) of the front door when viewed from the side. Therefore, also when the vehicle 10 is involved in a frontal collision, a frontal collision load is transmitted to the beltline R/F via the brace 70.

Furthermore, the brace 70 includes the brace-side bead portion 76 that extends in the vehicle longitudinal direction. Thus, the bending rigidity of the brace 70 in the vehicle vertical direction and the vehicle longitudinal direction is increased by the brace-side bead portion 76, so that the side collision load transmitted to the brace 70 is efficiently transmitted to the cowl main body 30.

(Modifications)

Figure 5:
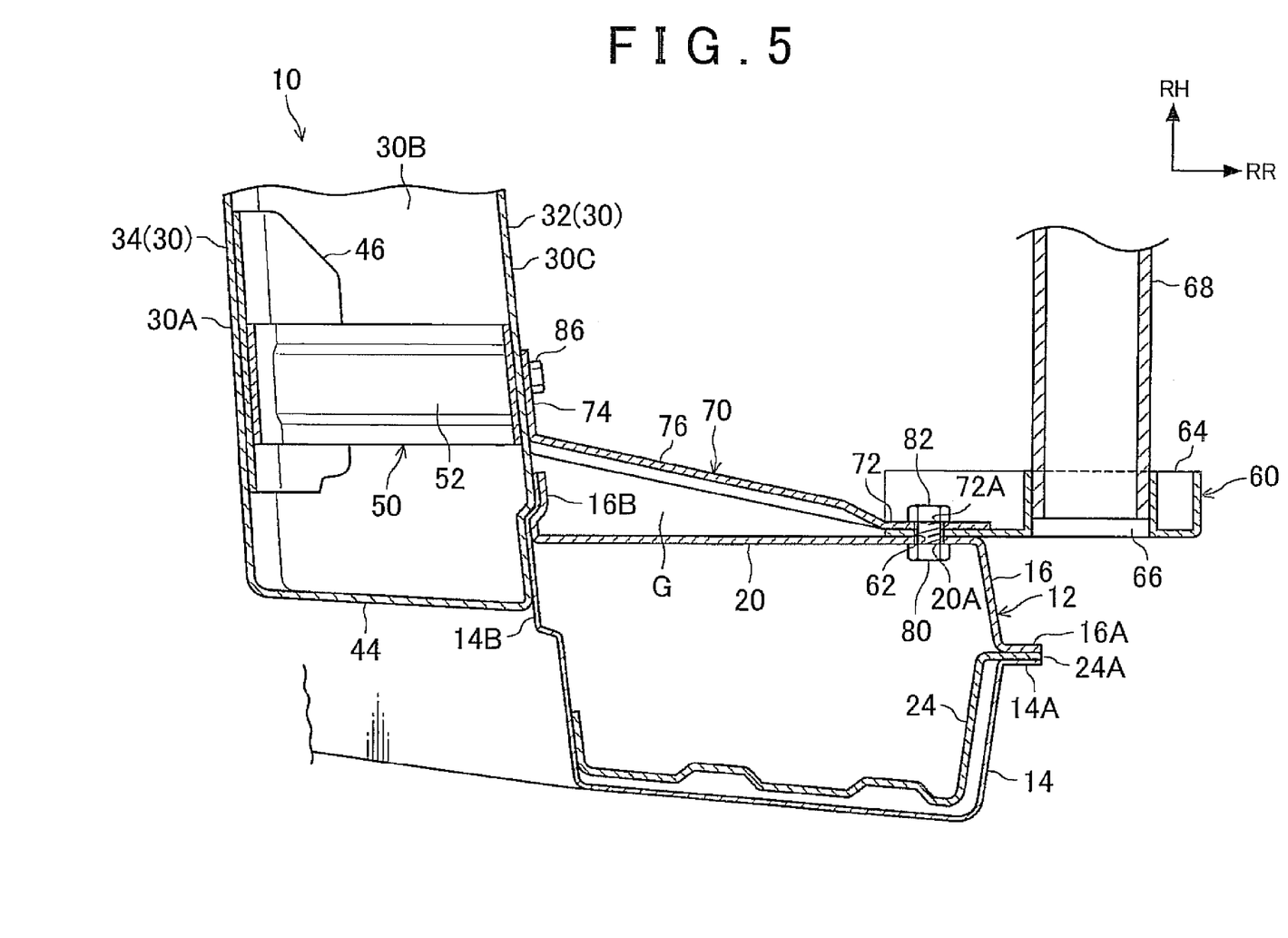
FIG. 5 is a horizontal sectional view of main portions of a vehicle to which a body front structure of a vehicle according to an example embodiment of the invention has been applied, as viewed from above the vehicle.

Modifications have a structure similar to that of the example embodiments, but differ therefrom in the following points. As shown in FIG. 5, in a modified example, the bottom wall 20 of the protruding portion 18 of the front pillar inner panel 16 extends toward the front of the vehicle, and is connected to the front flange portion 16B. Also, in this case as well, the gap G is formed between the bottom wall 20 and the brace 70. Therefore, interference between the brace 70 and the front-side portion of the front pillar inner panel 16 with respect to the vehicle when a barrier side collision occurs is suppressed.

In the example embodiment, the width dimension W1 of the front brace fixing portion 74 of the brace 70 is set smaller than the width dimension W2 of the balk 50, and the front brace fixing portion 74 is arranged to fall within the width of the balk 50. Alternatively, however, a portion of the front brace fixing portion 74 and a portion of rear end portion of the balk 50 with respect to the vehicle may be arranged so as to overlap when viewed along the vehicle longitudinal direction. In this case as well, the side collision load from the brace 70 is efficiently transmitted to the front wall 30A of the cowl main body 30 via the balk 50.

While, in the example embodiment, the cowl reinforcement 46 is provided in the cowl main body 30, the cowl reinforcement 46 may be omitted. In this case, a front end portion of the balk 50 with respect to the vehicle is joined to the front wall 30A of the cowl main body 30.

Moreover, in the example embodiment, the rear-side end portion of the balk 50 with respect to the vehicle is fastened (i.e., fixed) to the rear wall 30C of the cowl main body 30 by the bolt 90 and the weld nut 88. Instead of this, the rear-side end portion of the balk 50 with respect to the vehicle may be fixed to the rear wall 30C of the cowl main body 30 by spot welding or the like.

Also, in the example embodiment, the brace 70 and the instrument panel R/F bracket 60 are fastened (i.e., fixed) to the front pillar inner panel 16 at one location by the bolt 82 and the weld nut 80. Instead, the brace 70 and the instrument panel R/F bracket 60 may be fastened (i.e., fixed) to the front pillar inner panel 16 in two locations by bolts 82 and weld nuts 80.

The front pillar inner panel may include a protruding portion that is formed on a rear-side portion of the front pillar inner panel with respect to the vehicle and protrudes farther inward in the vehicle width direction than a general surface of the front pillar inner panel in a horizontal sectional view, and the second connecting member may be fixed, together with the bracket, to the protruding portion.

In this structure, the protruding portion is formed on the front pillar inner panel, and the protruding portion protrudes farther inward in the vehicle width direction than the general surface of the front pillar inner panel in a horizontal sectional view. Also, the second connecting member is fixed, together with the bracket, to this protruding portion.

Therefore, a gap is formed between a front portion of the second connecting member with respect to the vehicle and the general surface of the front pillar inner panel, so interference between the second connecting member and the general surface when a barrier side collision occurs is suppressed. As a result, the position where the side collision load acts on the second connecting member and the bracket is reliably set.

Moreover, the protruding portion is formed on a vehicle rear-side portion of the front pillar inner panel, so that it is possible to shorten the distance from the portion where the second connecting member and the bracket are fixed to the protruding portion, to the inner panel reinforcement. Therefore, it is possible to reduce the bending moment that acts on the instrument panel reinforcement from the side collision load input to the bracket, so that it is possible to receive the side collision load, while suppressing bending of the instrument panel reinforcement.

The second connecting member may extend, inclined inward in the vehicle width direction, from the rear end portion toward the front end portion in a plan view.

With this structure, the second connecting member extends, inclined inward in the vehicle width direction, from the rear end portion toward the front end portion in a plan view, so that the extending direction of the second transmitting member is made closer to the direction of the side collision load, compared with that in the case where the second connecting member extends toward the front of the vehicle from the rear end portion toward the front end portion. As a result, the side collision load when a barrier side collision occurs is effectively transmitted to the cowl.

The second transmitting member may be arranged at the same height as the instrument panel reinforcement.

With this structure, the second connecting member is arranged at the same height as the instrument panel reinforcement, so that a side collision load can be efficiently distributed to the cowl.

The second connecting member may be arranged along the vehicle longitudinal direction at the same height as a door beltline of the vehicle in a side view.

With this structure, the second connecting member is arranged along the vehicle longitudinal direction at the same height as the door beltline of the vehicle in a side view, so that, when the vehicle is involved in a frontal collision as well, a frontal collision load is transmitted to the door beltline portion (i.e., the beltline reinforcement) of the vehicle via the second connecting member.

The second connecting member may include a reinforcing portion that extends in the vehicle longitudinal direction.

With this structure, the second connecting member includes the reinforcing portion that extends in the vehicle longitudinal direction, so that the bending rigidity of the second connecting member in the vehicle vertical direction and the vehicle longitudinal direction is increased. As a result, the side collision load transmitted to the second connecting member is efficiently transmitted to the cowl.

What is claimed is:

1. A body front structure of a vehicle, comprising:
a first connecting member that extends in a vehicle width direction, is open upward in a side sectional view taken along a vehicle longitudinal direction, and connects a front end portion and a rear end portion of a cowl together; and
a second connecting member that extends in the vehicle longitudinal direction, in a position to a rear of the cowl in the vehicle longitudinal direction and to an inside of a front pillar inner panel in the vehicle width direction, a front end portion of the second connecting member being fixed to the rear end portion of the cowl so as to overlap with the first connecting member when viewed along the vehicle longitudinal direction, and a rear end portion of the second connecting member being fixed, together with a bracket that is joined to an instrument panel reinforcement, to the front pillar inner panel.

2. The body front structure according to claim 1, wherein
the front pillar inner panel includes a protruding portion that is formed on a rear-side portion of the front pillar inner panel with respect to the vehicle and protrudes farther inward in the vehicle width direction than a general surface of the front pillar inner panel in a horizontal sectional view; and
the second connecting member is fixed, together with the bracket, to the protruding portion.

3. The body front structure according to claim 2, wherein
the front pillar inner panel, the bracket, and the second connecting member are fastened together with a bolt and a nut.

4. The body front structure according to claim 1, wherein
the second connecting member extends, inclined inward in the vehicle width direction, from the rear end portion toward the front end portion in a plan view.

5. The body front structure according to claim 1, wherein
the second connecting member is arranged at the same height as the instrument panel reinforcement.

6. The body front structure according to claim 5, wherein
the second connecting member is arranged along the vehicle longitudinal direction at the same height as a door beltline portion of the vehicle in a side view.

7. The body front structure according to claim 1, wherein
the second connecting member includes a reinforcing member that extends in the vehicle longitudinal direction.

8. The body front structure according to claim 7, wherein
the reinforcing member is a bead portion that protrudes inward from the second connecting member in the vehicle width direction.

9. The body front structure according to claim 1, wherein
the first connecting member is arranged at the same height as the instrument panel reinforcement.

10. The body front structure according to claim 9, wherein
the first connecting member is arranged along the vehicle longitudinal direction at the same height as a door beltline portion of the vehicle in a side view.

11. The body front structure according to claim 1, wherein
the first connecting member includes a connection reinforcing portion that extends in the vehicle longitudinal direction.

12. The body front structure according to claim 11, wherein
the connection reinforcing portion is a bead portion that protrudes upward with respect to the vehicle from the first connecting member.

13. The body front structure according to claim 1, wherein
a front fixing portion is formed on a front end portion of the second connecting member with respect to the vehicle, and
the front fixing portion is bent inward in the vehicle width direction, and is arranged facing the rear end portion of the cowl and a rear end portion of the first connecting member with respect to the vehicle.

14. The body front structure according to claim 1, wherein
a width dimension of the front fixing portion is set smaller than a width dimension of the first connecting member, and
the front fixing portion is arranged to fall within a width of the first connecting member.

* * * * *